United States Patent
Watabe

(10) Patent No.: US 7,209,420 B2
(45) Date of Patent: Apr. 24, 2007

(54) OPTICAL INFORMATION RECORDING ON AN OPTICAL INFORMATION RECORDING MEDIUM HAVING MULTIPLE LAYERS

(75) Inventor: Teruyasu Watabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 147 days.

(21) Appl. No.: 10/927,592

(22) Filed: Aug. 27, 2004

(65) Prior Publication Data

US 2005/0025014 A1 Feb. 3, 2005

Related U.S. Application Data

(63) Continuation of application No. PCT/JP04/03403, filed on Mar. 15, 2004.

(30) Foreign Application Priority Data

| Mar. 25, 2003 | (JP) | ............................. 2003-083368 |
| Jan. 7, 2004 | (JP) | ............................. 2004-002339 |

(51) Int. Cl.
  *G11B 5/09* (2006.01)
(52) U.S. Cl. .................................. 369/47.53; 369/53.2
(58) Field of Classification Search ............... 369/53.2, 369/47.53; *G11B 5/09*
See application file for complete search history.

(56) References Cited

U.S. PATENT DOCUMENTS

| 5,943,086 | A | 8/1999 | Watabe et al. |
| 6,118,738 | A * | 9/2000 | Uehara .................... 369/30.35 |
| 6,339,571 | B1 * | 1/2002 | Torazawa et al. .......... 369/53.2 |
| 6,426,929 | B1 | 7/2002 | Watabe et al. |
| 6,643,238 | B2 * | 11/2003 | Nakajima ................. 369/53.22 |
| 6,778,479 | B2 * | 8/2004 | Weng ....................... 369/47.55 |
| 6,898,162 | B2 * | 5/2005 | Su et al. .................... 369/47.5 |
| 7,038,982 | B2 * | 5/2006 | Schreurs et al. ......... 369/47.53 |
| 2002/0018419 | A1 | 2/2002 | Watabe |
| 2002/0136122 | A1 | 9/2002 | Nakano |
| 2002/0191518 | A1 | 12/2002 | Watabe |

FOREIGN PATENT DOCUMENTS

| JP | 11-195243 | 7/1999 |
| JP | 2000-311346 | 11/2000 |
| JP | 2001-052342 | 2/2001 |
| JP | 2001-184792 | 7/2001 |
| JP | 2002-50053 | 2/2002 |
| JP | 2002-358637 | 12/2002 |
| JP | 2003-22532 | 1/2003 |

* cited by examiner

*Primary Examiner*—A M Psitos
(74) *Attorney, Agent, or Firm*—Dickstein Shapiro LLP

(57) ABSTRACT

An optical information recording apparatus for recording information on an optical information recording medium with multiple recording layers is disclosed. The optical information recording apparatus, performing an OPC operation before performing the recording, includes a reading part reading information on the type of the medium recorded thereon, a storage unit storing information on a recording condition at the time of performing the OPC operation for each recording layer with respect to each medium type, a recording condition obtaining part reading out the recording condition corresponding to the read type when the recording condition is stored in the storage unit, and reading the recording condition recorded in a corresponding one of the recording layers recording their respective recording conditions when the recording condition is not stored in the storage unit, and an OPC performance part performing the OPC operation using the obtained recording condition.

19 Claims, 9 Drawing Sheets

FIG.7

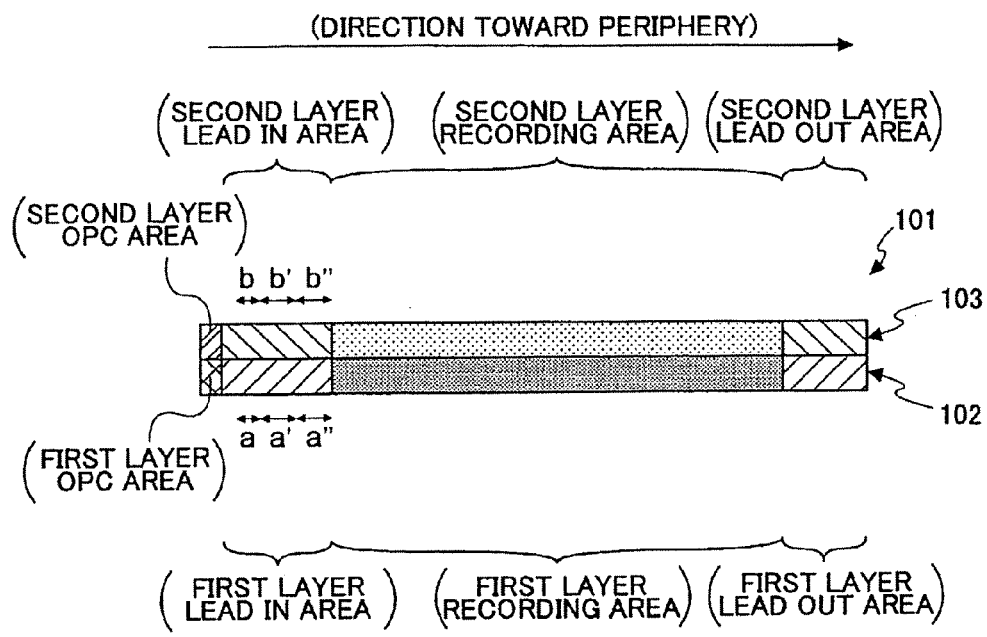

a indicates an area where the medium information of the first layer is recorded.
b indicates an area where the medium information of the second layer is recorded.
a' indicates an area where the multilayer recording conditions of the first layer when the second layer is in an erased state are recorded.
b' indicates an area where the multilayer recording conditions of the second layer when the first layer is in an erased state are recorded.
a" indicates an area where the multilayer recording conditions of the first layer when the second layer is in a recorded state are recorded.
b" indicates an area where the multilayer recording conditions of the second layer when the first layer is in a recorded state are recorded.

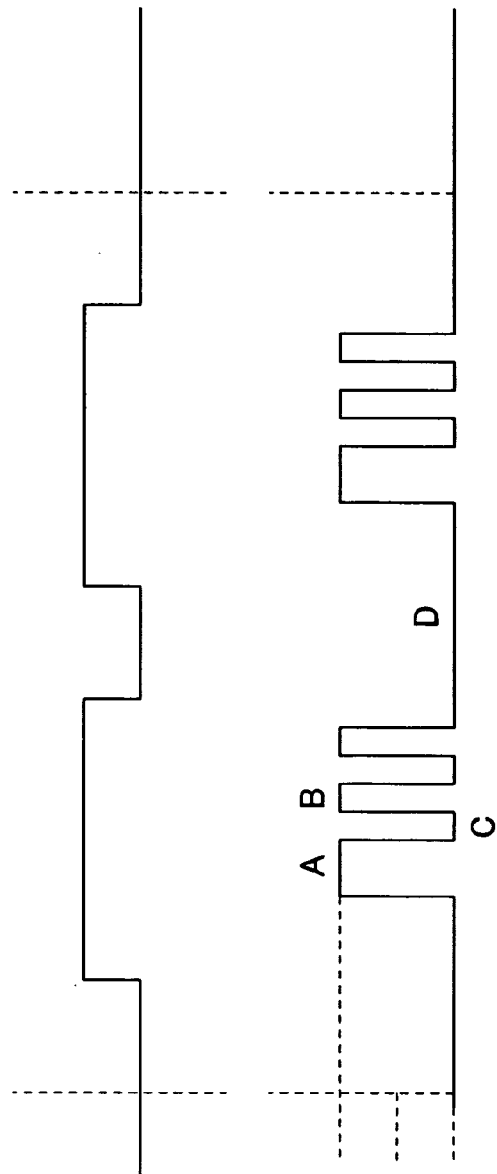

OPTICAL INFORMATION RECORDING ON AN OPTICAL INFORMATION RECORDING MEDIUM HAVING MULTIPLE LAYERS

CROSS-REFERENCE TO RELATED APPLICATION

This application is a U.S. continuation application filed under 35 USC 111(a) claiming benefit under 35 USC 120 and 365(c) of PCT application JP2004/003403, filed Mar. 15, 2004, which claims priority to Japanese Patent Applications No. 2003-083368, filed on Mar. 25, 2003, and No. 2004-002339, filed on Jan. 7, 2004. The foregoing applications are hereby incorporated by reference.

BACKGROUND OF THE INVENTION

1. Field of the Invention

The present invention relates generally to optical information recording apparatuses, optical information recording media, optical information recording methods, and computer-readable information storage media, and more particularly to an optical information recording apparatus, an optical information recording medium, an optical information recording method, and a computer-readable information storage medium for recording information on an optical information recording medium having multiple recording layers on each of which recording is performable.

2. Description of the Related Art

The structure of a recording medium whose recording layer has a multilayer structure and a recording and reproduction method therefor are disclosed in, for instance, Japanese Laid-Open Patent Application No. 11-195243.

A technique for recording, on each data layer of an optical medium of multilayer structure, information characteristic of the data layer is disclosed in Japanese Laid-Open Patent Application No. 2002-50053.

Further, OPC (Optimum Power Control) for an optical disk of multilayer structure is disclosed in Japanese Laid-Open Patent Application No. 2000-311346.

SUMMARY OF THE INVENTION

With the spread of multimedia, playback-only media (recording media) such as music CDs, CD-ROMs, and lately, DVD-ROMs and information reproduction apparatuses therefor have been put to practical use. Further, in recent years, phase change media as well as write-once optical disks using dye media and rewritable magneto-optical (MO) disks using MO media have attracted attention, and information recording and reproduction apparatuses using these recording media have been put to practical use. Further, rewritable DVD media have attracted great attention as next-generation multimedia recording media and large-capacity storage media.

Information is recorded on phase change media by changing the phase of their recording material reversibly between crystalline and amorphous phases. Unlike MO media, information can be recorded on and reproduced from phase change media with only laser light from a light source composed of a semiconductor laser without requiring an external magnetic field. Further, overwrite recording, by which information recording and erasure are simultaneously performed with laser light, is performable on phase change media.

General recording waveforms for recording information on dye media include, for instance, a single-pulse semiconductor laser light emission waveform generated based on the eight-to-sixteen modulation code. However, single-pulse recording with this recording waveform causes a problem in that teardrop-like distortion occurs in recording marks because of heat storage. Accordingly, as shown in FIG. 8C, a method that forms marks on dye media with laser light of a multi-pulse waveform based on recording data of, for instance, the EFM modulation code has been proposed as an LD light emission waveform regulation (strategy) for recording information on dye media. A method that forms the mark part of the multi-pulse waveform of a starting heating pulse and multiple subsequent successive heating pulses has been proposed. FIG. 8A shows a channel clock signal, FIG. 8B shows an eight-to-sixteen modulated signal, and FIG. 8C shows a light waveform.

In general, the optimum value of recording power in the case of performing recording on optical recording media varies depending on ambient temperature, the recording medium type, and linear velocity. Accordingly, in general, optical information recording apparatuses perform optimization of recording power by trial writing called OPC (Optimum Power Control) at the time of performing recording on dye media and phase change media. OPC is performed by recording predetermined information in a predetermined region of a recording medium called PCA (Power Calibration Area) and reproducing the predetermined information.

Specifically, test data of a predetermined pattern formed of marks and spaces, 3 to 14 times the period T of the channel clock signal (3T to 14T), is recorded by varying light emission power with several levels. The test data is reproduced, and the DC modulation of an RF signal and the asymmetry of the RF signal after AC coupling at each power level are calculated as evaluation standards. For instance, modulation M is calculated as:

$$M = Ip\text{-}p / I\max, \tag{1}$$

where Ip–p is the maximum amplitude of the RF signal and Imax is the maximum value of the RF signal.

Further, asymmetry β after AC coupling is expressed, using the positive peak level X1 and the negative peak level X2 of the RF signal after AC coupling, as:

$$\beta = (X1+X2)/(X1-X2), \tag{2}$$

where "X1+X2" indicates the difference between the positive and negative peak levels of the RF signal after AC coupling, and "X1–X2" indicates the peak-to-peak value of the RF signal after AC coupling.

Optimum recording power is obtained based on this modulation M or asymmetry β after AC coupling.

In the case of recording information on a write-once or rewritable medium, it is necessary to set recording conditions corresponding to the type of the medium. Here, the recording conditions are generally a recording power set value and a recording pulse shape applied at the time of performing OPC. If the type (such as a manufacturer's name and type identification information) of a medium to be subjected to recording can be identified in an optical information recording apparatus, the recording conditions corresponding to the medium may be prestored in the memory of the optical information recording apparatus. In DVD+R and DVD+RW media, the manufacturer and the type of a medium are pre-recorded in a wobble signal recorded in a pregroove formed on the recording track called ADIP (Address In Groove) of a predetermined region.

If the optical information recording apparatus cannot identify a medium type (in the case of an unknown medium), a recording power set value and a recording pulse waveform at the time of OPC are determined based on the ADIP information of the predetermined region, in which information recording conditions identified by the manufacturer of the medium are recorded.

By the way, the technique of forming a recording surface in multiple layers is known as an approach to recording more information on optical recording media than conventionally. DVD-ROM media with a recording surface of double-layer structure have been put to practical use already (see above-mentioned Japanese Laid-Open Patent Application No. 11-195243 for the structure of a recordable medium with a recording layer of multilayer structure and a recording and reproduction method therefor).

In the case of multilayer write-once or rewritable media, each recording layer has a different recording characteristic. Therefore, it is necessary to set recording conditions corresponding to each layer.

If the optical information recording apparatus can identify a medium type, recording conditions corresponding to each recording layer of the medium type may be prestored in the memory of the optical information recording apparatus. However, in the case of an unknown medium whose type cannot be identified by the optical information recording apparatus, recording conditions cannot be set differently for each recording layer in an optimum manner, thus causing a decrease in recording quality.

In this respect, if in a medium, each recording layer has its recording conditions recorded thereon as in the technology disclosed in the above second patent-related document, it is possible to respond by reading the recording conditions recorded in the recording layer even if the medium is unknown to the optical information recording apparatus.

However, an attempt to set recording conditions uniformly by reading recording conditions recorded on each recording layer irrespective of medium type causes a problem in that a medium in which each recording layer does not have its recording conditions recorded thereon cannot be supported even when the medium is not unknown.

Further, in the case of, for instance, double-layer media, light is transmitted through the first-layer recording layer so that information is recorded on the second layer. This causes a problem in that the amount of light reaching the second layer varies depending on whether the first layer is in an erased state (high reflectance) or a recorded state (low reflectance), thus varying optimum recording power.

An object of the present invention is to make it possible to support an optical information recording medium even if each recording layer does not have its recording conditions recorded thereon.

Another object of the present invention is to make it possible to perform optimum OPC in this case irrespective of whether the same region in a recording layer other than a recording layer on which OPC is to be performed is in an erased state or a recorded state.

The above objects of the present invention are achieved by an optical information recording apparatus for recording information on an optical information recording medium having a structure of multiple recording layers on each of which recording is performable, the optical information recording apparatus performing a predetermined OPC operation in advance at a time of performing the recording, the optical information recording apparatus including: a reading part configured to read information on a type of the optical information recording medium, the information being recorded on the optical information recording medium; a storage unit configured to store information on a recording condition at a time of performing the predetermined OPC operation for each of the recording layers with respect to one or each of a plurality of types of optical information recording media; a recording condition obtaining part configured to read out the recording condition corresponding to the read type when the recording condition is stored in the storage unit, and read the recording condition recorded in a corresponding one of the recording layers of the optical information recording medium, the recording layers recording the respective recording conditions thereof, when the recording condition is not stored in the storage unit; and an OPC performance part configured to perform the predetermined OPC operation using the obtained recording condition.

Preferably, the above-described optical information recording apparatus further includes a determination part configured to determine whether a same area in one of the recording layers other than the corresponding one of the recording layers on which the predetermined OPC operation is to be performed is in an erased state or a recorded state, wherein with respect to each of the recording layers, the storage unit stores the information on the recording condition for each of a case where the other one of the recording layers is in the erased state and a case where the other one of the recording layers is in the recorded state, and the recording condition obtaining part, at a time of reading out the recording condition stored in the storage unit, reads out the recording condition of the case of the erased state or the case of the recorded state in accordance with the determination, and at a time of reading the recording condition recorded in the corresponding one of the recording layers, reads one of the recording conditions recorded in the corresponding one of the recording layers in accordance with the determination, the recording conditions being of the case where the other one of the recording layers is in the erased state and the case where the other one of the recording layers is in the recorded state, respectively.

In the above-described optical information recording apparatus, the recording condition preferably includes at least a recording power set value at the time of performing the predetermined OPC operation.

In the above-described optical information recording apparatus, the recording condition preferably includes at least a recording pulse shape at the time of performing the predetermined OPC operation.

In the above-described optical information recording apparatus, the recording condition preferably includes at least a recording light wavelength at the time of performing the predetermined OPC operation.

In the above-described optical information recording apparatus, the recording condition preferably includes at least a maximum recording rate at the time of performing the predetermined OPC operation.

The above objects of the present invention are also achieved by an optical information recording medium having a structure of multiple recording layers on each of which recording is performable, wherein: in each of the recording layers, a recording condition at a time of performing a predetermined OPC operation on the recording layer is recorded for each of a case where one of the recording layers other than the recording layer is in an erased state and a case where the other one of the recording layers is in a recorded state.

The above objects of the present invention are also achieved by an optical information recording method for recording information on an optical information recording medium having a structure of multiple recording layers on each of which recording is performable, the optical information recording method performing a predetermined OPC operation in advance at a time of performing the recording, the optical information recording method including: a reading step of reading information on a type of the optical information recording medium, the information being recorded on the optical information recording medium; a recording condition obtaining step of, referring to a storage unit configured to store information on a recording condition at a time of performing the predetermined OPC operation for each of the recording layers with respect to one or each of a plurality of types of optical information recording media, reading out the recording condition corresponding to the type read in the reading step when the recording condition is stored in the storage unit, and reading the recording condition recorded in a corresponding one of the recording layers of the optical information recording medium, the recording layers recording the respective recording conditions thereof, when the recording condition is not stored in the storage unit; and an OPC performance step of performing the predetermined OPC operation using the recording condition obtained by the recording condition obtaining step.

Preferably, the above-described optical information recording method further includes a determination step of determining whether a same area in one of the recording layers other than the corresponding one of the recording layers on which the predetermined OPC operation is to be performed is in an erased state or a recorded state, wherein with respect to each of the recording layers, the storage unit stores the information on the recording condition for each of a case where the other one of the recording layers is in the erased state and a case where the other one of the recording layers is in the recorded state, and the recording condition obtaining step, at a time of reading out the recording condition stored in the storage unit, reads out the recording condition of the case of the erased state or the case of the recorded state in accordance with the determination, and at a time of reading the recording condition recorded in the corresponding one of the recording layers, reads one of the recording conditions recorded in the corresponding one of the recording layers in accordance with the determination, the recording conditions being of the case where the other one of the recording layers is in the erased state and the case where the other one of the recording layers is in the recorded state, respectively.

In the above-described optical information recording method, the recording condition preferably includes at least a recording power set value at the time of performing the predetermined OPC operation.

In the above-described optical information recording method, the recording condition preferably includes at least a recording pulse shape at the time of performing the predetermined OPC operation.

In the above-described optical information recording method, the recording condition preferably includes at least a recording light wavelength at the time of performing the predetermined OPC operation.

In the above-described optical information recording method, the recording condition preferably includes at least a maximum recording rate at the time of performing the predetermined OPC operation.

According to the above-described present invention, a recording condition corresponding to a recording layer of an optical information recording medium can be obtained from the recording layer. Accordingly, it is possible to perform OPC on each recording layer under an optimum recording condition therefor. However, when the optical information recording medium is a known one stored in a storage unit, a recording condition of the optical information recording medium prestored in the storage unit is employed. Therefore, even if the recording condition of a recording layer is not recorded in the recording layer in the optical information recording medium, it is possible to support the optical information recording medium.

Further, the above-described present invention may be configured so that optimum OPC can be performed irrespective of whether the same area in a recording layer other than a recording layer on which OPC is to be performed is in an erased state or a recorded state.

Further, the above-described present invention may be configured so that OPC can be performed with a recording power set value at the time of performing OPC being optimized.

Further, the above-described present invention may be configured so that OPC can be performed with a recording pulse shape at the time of performing OPC being optimized.

Further, the above-described present invention may be configured so that OPC can be performed with a recording light wavelength at the time of performing OPC being optimized.

Further, the above-described present invention may be configured so that OPC can be performed with a maximum recording rate at the time of performing OPC being optimized.

Further, according to the present invention, optimum OPC can be performed irrespective of whether the same area in a recording layer other than a recording layer on which OPC is to be performed is in an erased state or a recorded state.

The above objects of the present invention are also achieved by a computer-readable information storage medium storing a program for causing a computer to execute an operation of controlling an optical information recording apparatus for recording information on an optical information recording medium having a structure of multiple recording layers on each of which recording is performable, the optical information recording apparatus performing a predetermined OPC operation in advance at a time of performing the recording, the program including instructions to cause the computer to operate as: a reading part configured to read information on a type of the optical information recording medium, the information being recorded on the optical information recording medium; a recording condition obtaining part configured to read out a recording condition corresponding to the read type when the recording condition is stored in a storage unit storing information on a recording condition at a time of performing the predetermined OPC operation for each of the recording layers with respect to one or each of a plurality of types of optical information recording media, and read the recording condition recorded in a corresponding one of the recording layers of the optical information recording medium, the recording layers recording the respective recording conditions thereof, when the recording condition is not stored in the storage unit; and an OPC performance part configured to perform the predetermined OPC operation using the recording condition obtained by the recording condition obtaining part.

Preferably, in the above-described computer-readable information storage medium, the program further causes the computer to operate as a determination part configured to determine whether a same area in one of the recording layers other than the corresponding one of the recording layers on which the predetermined OPC operation is to be performed is in an erased state or a recorded state, and when the program causes the computer to operate as the recording condition obtaining part, the program causes the computer to read out, at a time of reading out the recording condition stored in the storage unit storing, with respect to each of the recording layers, the information on the recording condition for each of a case where the other one of the recording layers is in the erased state and a case where the other one of the recording layers is in the recorded state, the recording condition of the case of the erased state or the case of the recorded state in accordance with the determination, and at a time of reading the recording condition recorded in the corresponding one of the recording layers, read one of the recording conditions recorded in the corresponding one of the recording layers in accordance with the determination, the recording conditions being of the case where the other one of the recording layers is in the erased state and the case where the other one of the recording layers is in the recorded state, respectively.

In the above-described computer-readable information storage medium, the recording condition preferably includes at least a recording power set value at the time of performing the predetermined OPC operation.

In the above-described computer-readable information storage medium, the recording condition preferably includes at least a recording pulse shape at the time of performing the predetermined OPC operation.

In the above-described computer-readable information storage medium, the recording condition preferably includes at least a recording light wavelength at the time of performing the predetermined OPC operation.

In the above-described computer-readable information storage medium, the recording condition preferably includes at least a maximum recording rate at the time of performing the predetermined OPC operation.

By causing a computer to execute a program stored in a storage medium according to the above-described present inventions, the same effects as described above can be produced.

BRIEF DESCRIPTION OF THE DRAWINGS

Other objects, features and advantages of the present invention will become more apparent from the following detailed description when read in conjunction with the accompanying drawings, in which:

FIG. 7 is an explanatory diagram showing another structure of the medium;

FIGS. 8A, 8B, and 8C are timing charts of a channel clock signal, an eight-to-sixteen modulated signal, and a light waveform, respectively, in the optical information recording and reproduction apparatus.

DETAILED DESCRIPTION OF THE PREFERRED EMBODIMENTS

A description is given below, with reference to the accompanying drawings, of an embodiment of the present invention.

Figure 1:
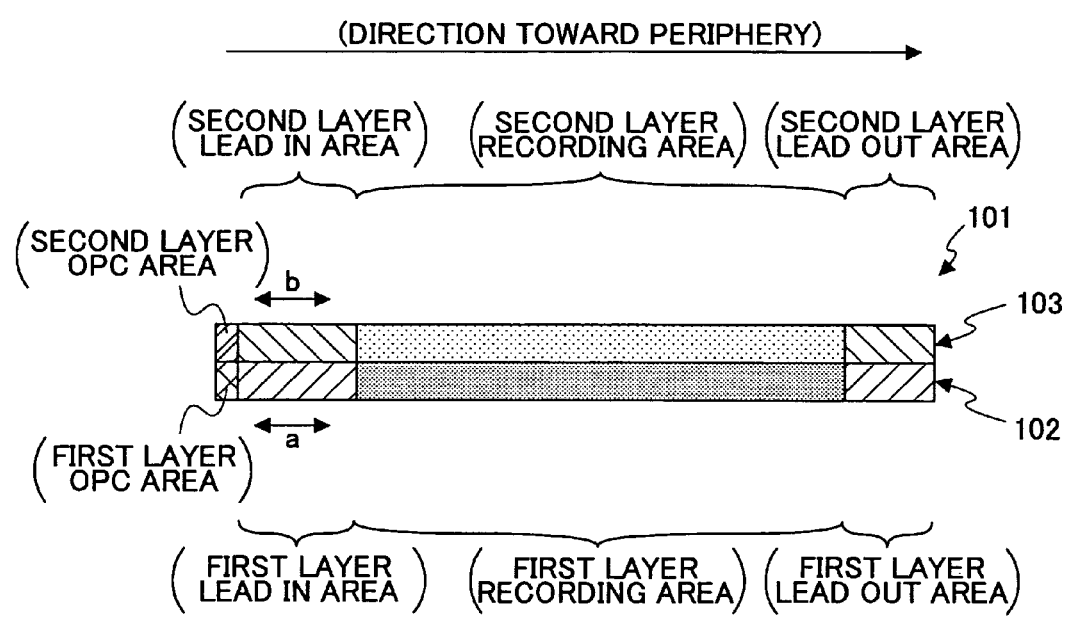
FIG. 1 is an explanatory diagram showing a structure of a medium according to an embodiment of the present invention.

FIG. 1 is an explanatory diagram illustrating a medium (an optical information recording medium) on which recording and reproduction is performed by an optical information recording and reproduction apparatus 1 (see FIG. 2 and the following) that is this embodiment. This medium 101 is a dye-based medium in which DVD-ROM format code data is of double-layer structure of recording layers 102 and 103 as shown in FIG. 1. Mark-edge (PWM: Pulse Width Modulation) recording is performed using the eight-to-sixteen modulation code as a data modulation method. In FIG. 1, a indicates an area where the medium information/recording conditions of the first layer are recorded, and b indicates an area where the medium information/recording conditions of the second layer are recorded.

It is assumed that in the medium 101, track address information and the like is recorded in a wobble signal recorded in a pregroove formed on a recording track in each of the recording layers 102 and 103.

Figure 2:
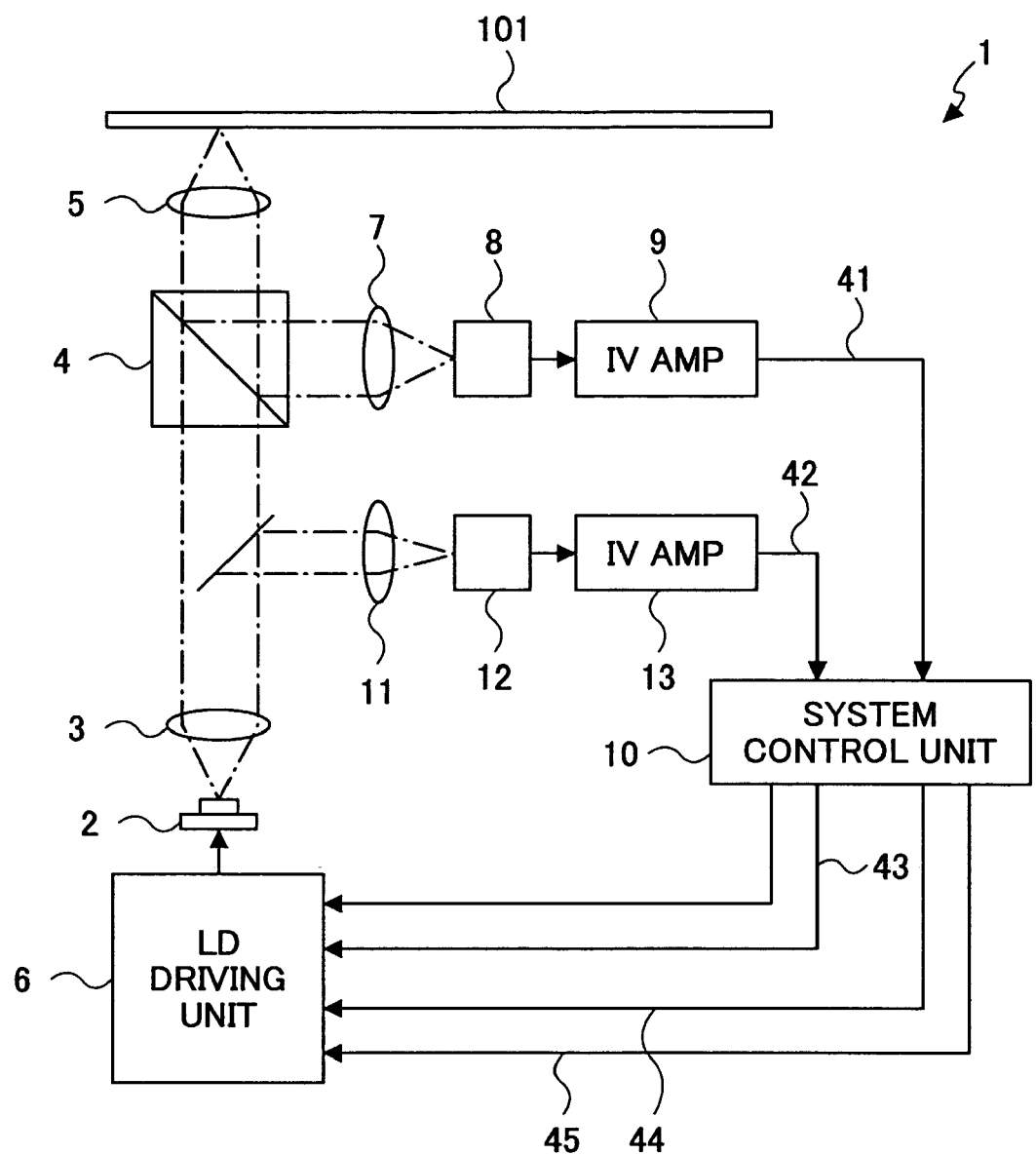
FIG. 2 is a block diagram showing a structure of an optical information recording and reproduction apparatus according to the embodiment of the present invention.
Figure 3:
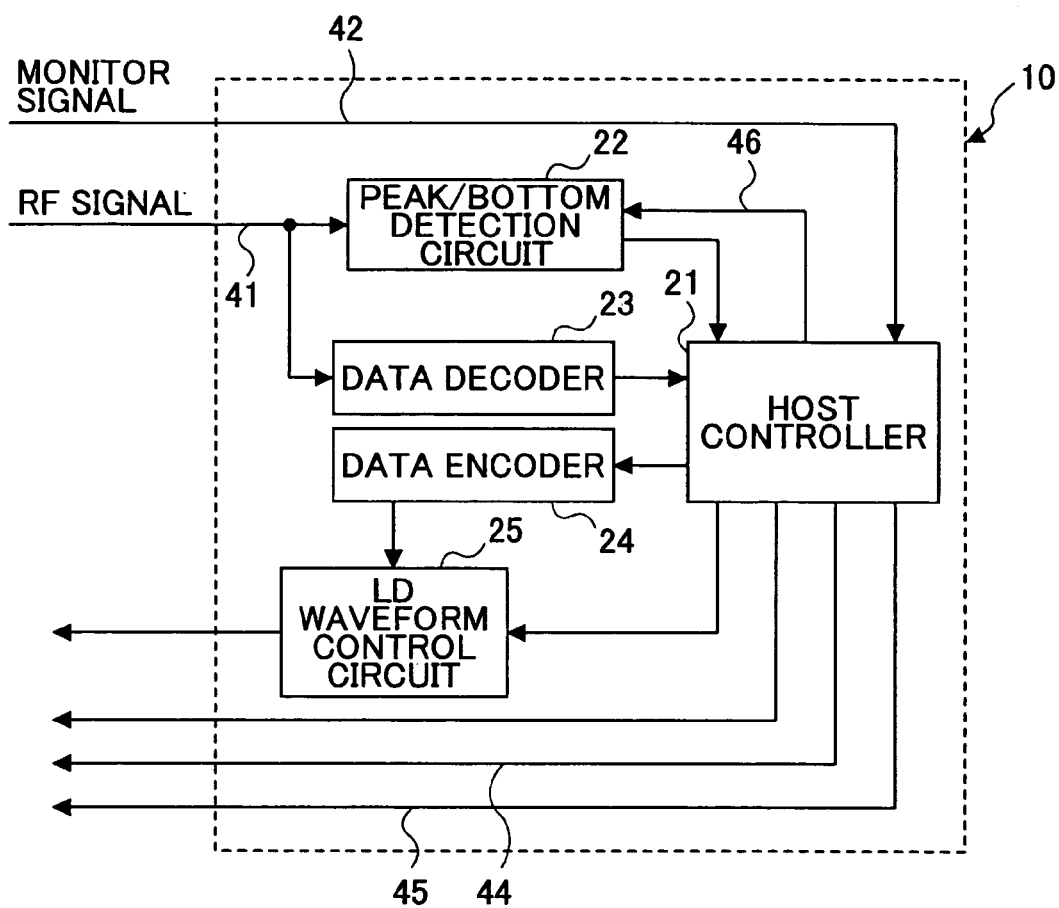
FIG. 3 is a block diagram showing a structure of a system control unit of the optical information recording and reproduction apparatus.

FIGS. 2 and 3 are block diagrams illustrating the overall configuration of the information recording and reproduction apparatus 1, which is this embodiment, and the configuration of a system control unit 10 thereof, respectively.

The optical information recording and reproduction apparatus 1, which implements an optical information recording apparatus of the present invention, performs information recording by forming recording marks by causing a semiconductor laser to perform multi-pulse light emission, using the medium 101 as described with reference to FIG. 1 and recording data.

According to the optical information recording and reproduction apparatus 1, at the time of information reproduction, an LD (laser diode) light source 2 is driven by an LD driving unit 6 so that the LD light source 2 emits light at reproduction power (read power). In an optical pick up not graphically represented, the light of reproduction power from the LD light source 2 is emitted so as to be focused on the predetermined layer 102 or 103 (see FIG. 1) of the medium 101 via predetermined optical elements 3, 4, and 5. Its reflected light is received by a light-receiving element 8 via the predetermined optical elements 5 and 4 and a predetermined optical element 7 so as to be subjected to photoelectric conversion. A current signal after the conversion is subjected to IV conversion and amplified in an IV amplifier 9, and a reproduction signal (an RF signal) 41 is obtained.

Further, part of the emitted light of the LD light source 2 enters a monitor PD (photodiode) 12 via a predetermined optical element 11 and the like, and a monitor current proportional to light emission power is subjected to IV conversion by an IV amplifier 13. By using an amplified power monitor signal 42, APC control can be performed.

At the time of information recording, a host controller 21 generates a pulse control signal 43 based on recording data formed of the eight-to-sixteen modulation code. The LD driving unit 6 drives the LD light source 2 with a driving current according to the pulse control signal 43 so that multi-pulse light as shown in FIG. 8C is emitted and the predetermined recording layer 102 or 103 of the medium 101 is illuminated therewith. As a result, recording marks are formed on the medium 101 so that information is recorded thereon. The host controller 21 outputs a bias level current driving signal 44 and a peak level current overlapping signal 45 to the LD driving unit 6 in order to control the light emission level of space/peak power.

The host controller 21 is a control unit that is formed mainly of a microcomputer and controls the entire optical information recording and reproduction apparatus 1. A peak/bottom detection circuit 22 detects the peaks and the bottoms of the RF signal 41, and outputs them to the host controller 21. A data decoder 23 decodes the RF signal 41 and outputs it to the host controller 21. A data encoder 24 encodes recording information from the host controller 21. An LD waveform control circuit 25 drives the LD driving unit 6 so as to control the waveform of laser light output by the LD light source 2 based on the decoded information. Although a detailed description is omitted, the optical information recording and reproduction apparatus 1 includes an actuator, a driving mechanism, and a control system of well-known configurations that control the optical pickup, which is not graphically represented, to perform a focus operation, a tracking operation, and a seek operation.

Figure 4:
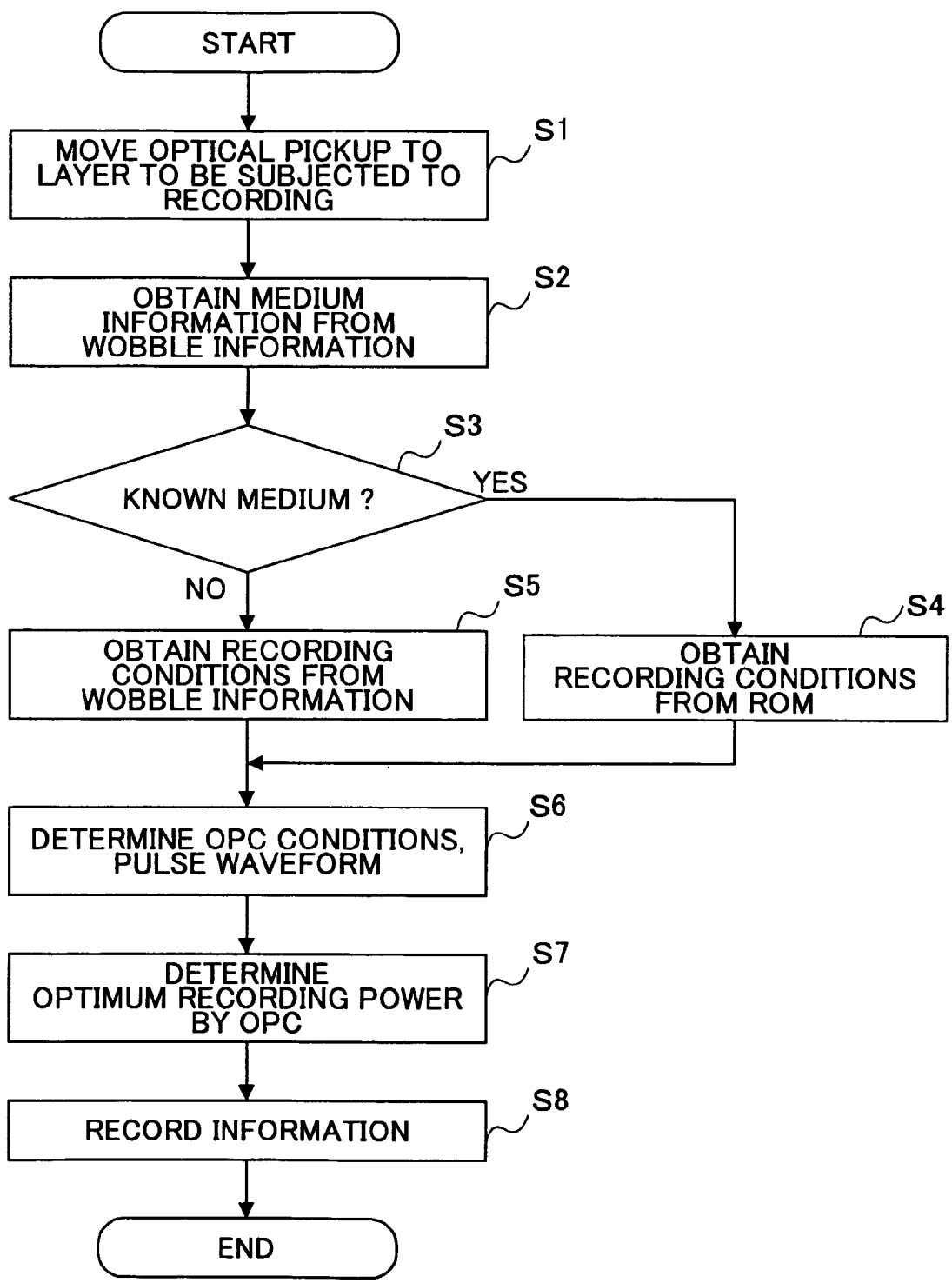
FIG. 4 is a flowchart of an operation performed by the optical information recording and reproduction apparatus.

Next, a description is given, with reference to the flowchart of FIG. 4, of an operations procedure up to the recording of information in the optical information recording and reproduction apparatus 1.

First, (the CPU of) the host controller 21 moves the optical pickup, which is not graphically represented, to the layer 102 or 103 to be subjected to recording of the medium 101 so as to obtain information identifying the type of the medium 101 (medium information recorded in the areas of A and B of FIG. 1) from the target layer 102 or 103 (step S1) As shown in FIG. 1, the management information area of the medium 101 called Lead In area exists inside the recording area of each of the layers 102 and 103 in the medium 101, and in one area therein, the medium information of the medium 101 is recorded as a wobble signal. This wobble signal makes it possible to obtain the name of the manufacturer of the medium 101 and medium information for identifying the medium type which information is provided by the manufacturer. Then, as the next processing, the area in the Lead In area is subjected to reproduction so that the medium information of the medium 101 is obtained from the wobble signal (a reading part, a reading step) (step S2).

If the type of the medium 101 identified from the wobble signal is a medium known to the optical information recording and reproduction apparatus 1 (is prestored in the ROM or the like of the host controller 21) (YES of step S3), values stored as table data in the storage of the host controller 21, such as the ROM, individually for the type of the medium 101 are determined as recording conditions (a recording power set value, a recording pulse shape, the light wavelength of recording light [a laser wavelength], a maximum recording rate, and the like at the time of performing OPC) (a recording condition obtaining part, a recording condition obtaining step) (step S4). The recording conditions are stored in the ROM or the like for each of the recording layers 102 and 103 of the medium 101 for each type of the medium 101.

If the medium 101 is an unknown medium that is not prestored in the ROM or the like of the optical information recording apparatus 1 (NO of step S3), recording conditions recorded by the wobble signal in the Lead In area of the medium 101 (recorded in the areas of a and b of FIG. 1) are read out (the recording condition obtaining part, the recording condition obtaining step) (step S5). The recording conditions are recorded for each of the recording layers 102 and 103 of the medium 101 (the recording conditions of the recording layer 102 are recorded in the area of a of the same recording layer 102, and the recording conditions of the recording layer 103 are recorded in the area of b of the same recording layer 103).

Then, based on the recording conditions obtained in step S4 or S5, OPC conditions and a recording pulse waveform are set (step S6). Here, the OPC conditions are a central power value in the case of recording with varying power and target asymmetry ($\beta$). In the case of known media, as these values, suitable values may be pre-obtained empirically for each type of the media and prestored in the ROM or the like in the optical information recording and reproduction apparatus 1. If the medium 101 is an unknown medium not stored in the ROM in the optical information recording and reproduction apparatus 1, values obtained from the wobble signal obtained in step S2 may be directly used. However, it is desirable to determine by multiplying the values by a predetermined coefficient.

Next, in order to determine optimum recording power, prior to an information recording operation, OPC is performed in the recording area and the OPC area of the layer 102 or 103 to be subjected to recording (see FIG. 1) (step S7).

Figure 5A:
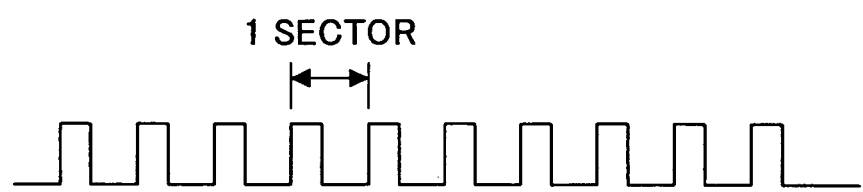
FIGS. 5A and 5B are explanatory diagrams illustrating OPC performed by the optical information recording and reproduction apparatus.
Figure 5B:
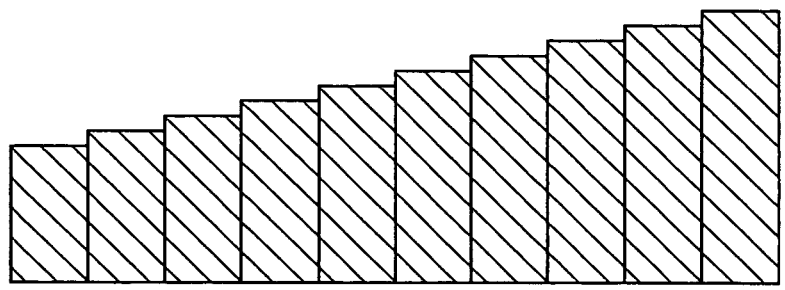

At the time of performing OPC, at every sector switching, the host controller 21 generates a sector synchronization signal 46 as shown in FIG. 5A, and at every generation of the sector synchronization signal 46, updates the peak level current overlapping signal 44 so as to vary the light emission power of the LD light source 2 step by step as shown in FIG. 5B. After the completion of the recording with the light emission power being varied step by step, the areas subjected to the recording are subjected to reproduction, and the RF signal 41 is sampled in each sector. The host controller 21 performs calculations based on the above-described Eq. (2) or the like so that asymmetry ($\beta$) is calculated in each sector, and determines light emission power at the time of a recording operation based on the calculated $\beta$s. FIG. 5A shows the sector synchronization signal 46, and FIG. 5B shows a recording waveform at the time of OPC.

When the optimum recording power is thus determined by performing OPC, the information recording operation is performed by well-known means (step S8).

Thus, in the case of performing recording on the unknown medium 101 (NO of step S3), the recording conditions corresponding to each of the recording layers 102 and 103 may be obtained individually from the ADIP information of the medium 101. Accordingly, recording can be performed with optimum recording setting conditions for each of the recording layers 102 and 103. However, in the case of the known medium 101 recorded in the ROM or the like of the optical information recording and reproduction apparatus 1 (YES of step S3), the recording conditions of the medium 101 prestored in the ROM or the like are employed. Therefore, even if the recording conditions of the recording layers 102 and 103 are not recorded in the recording layers 102 and 103, respectively, in the known medium 101, the known medium 101 can be supported.

Figure 6:
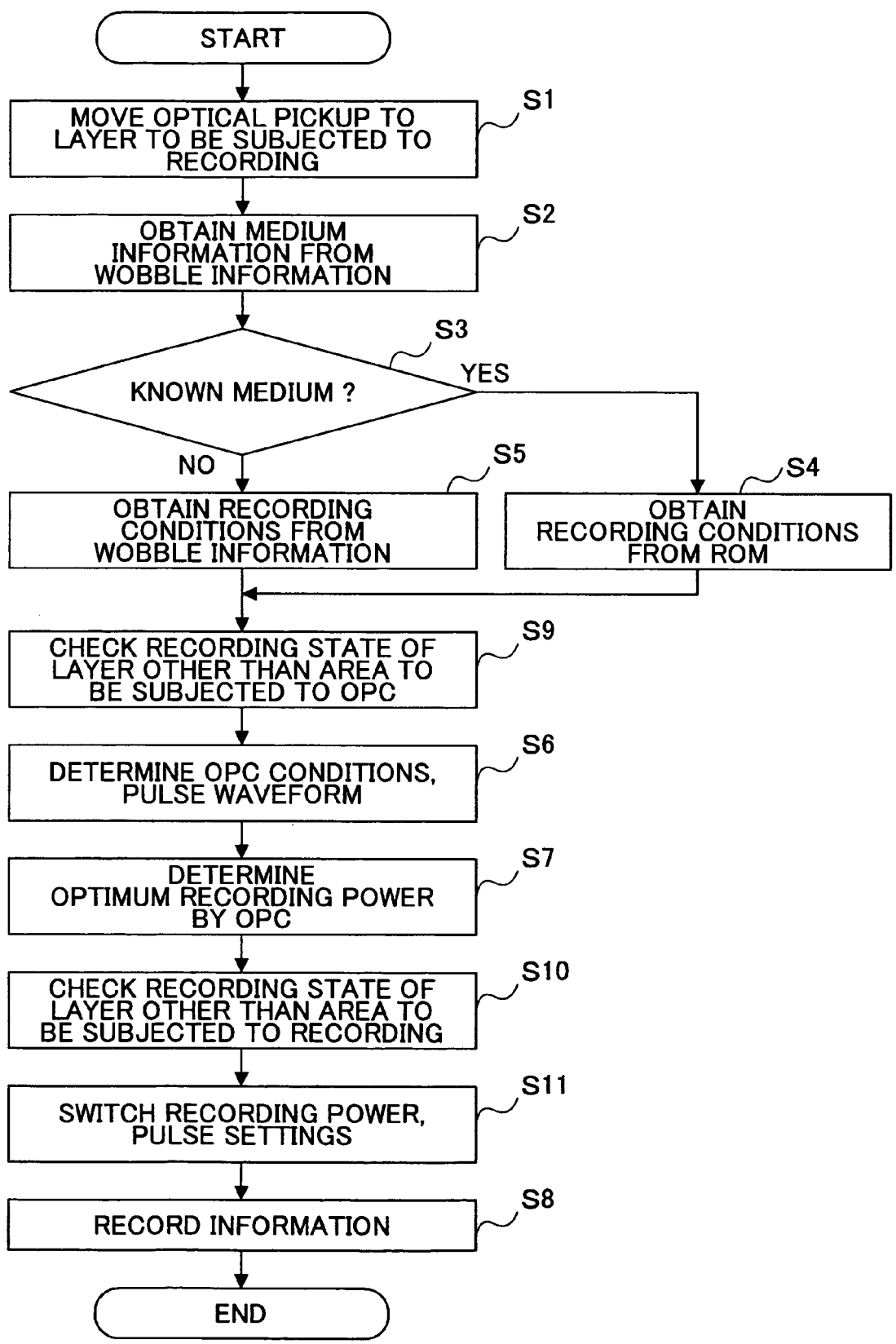
FIG. 6 is a flowchart of another operation performed by the optical information recording and reproduction apparatus.

Instead of the operation of FIG. 4, an operation shown in the next flowchart of FIG. 6 may be performed. That is, in the target medium 101 in this case, with respect to the recording conditions recorded in the Lead In area of each of the recording layers 102 and 103, two types are recorded according to whether the recording state of the other layer 103 or 102 is an erased state or a recorded state as shown in FIG. 7 (regions of a', a", b' and b" of FIG. 7). Likewise, with respect to the recording conditions stored in the ROM or the like of the host controller 21, two types of recording conditions are stored for each of the recording layers 102 and 103. In FIG. 7, a indicates an area where the medium information of the first layer is recorded, b indicates an area where the medium information of the second layer is recorded, a' indicates an area where the multilayer recording conditions of the first layer when the second layer is in an erased state are recorded, b' indicates an area where the multilayer recording conditions of the second layer when the first layer is in an erased state are recorded, a" indicates an area where the multilayer recording conditions of the first layer when the second layer is in a recorded state are recorded, and b" indicates an area where the multilayer recording conditions of the second layer when the first layer is in a recorded state are recorded.

In the case of recording information, in FIG. 6, steps with the same numerals as in FIG. 4 are the same operations as in the case of FIG. 4, and a detailed description thereof is omitted. In the operation of FIG. 6, first, before performing OPC (step S7), it is determined whether the same area in the other recording layer 102 or 103 as the area to be subjected to OPC is in an erased state or a recorded state (a determination part, a determination step) (step S9). According thereto, one of the above-described two types of recording conditions is employed, and the settings of OPC conditions and a recording pulse waveform are switched (step S6). For instance, when recording is performed on each of the recording layers 102 and 103 and information indicating that recording has been performed is recorded in the Lead In area or the like, the determination of step S9 can be performed by reading the information recorded in the Lead In area or the like. Alternatively, it may also be performed by determining the signal level of the RF signal 41 in the host controller 21.

At the time of recording information (step S8), it is determined whether the same area in the other recording layer 102 or 103 as the area to be subjected to recording is in an erased state or a recorded state (the determination of step S9 may be employed as it is for this) (step S10), and according thereto, recording power and a light emission pulse waveform are switched (step S11). The case where the light emission pulse waveform may be constant irrespective of the recording state of the other recording layer 102 or 103 may be considered. In this case, an operation switching only the recording power may be considered.

In the above description, the description is given taking the medium 101 whose recording layer has a double-layer structure as an example. However, the same operation as described above may also be performed when the recording layer has a multilayer structure of three or more layers. Further, in the above description, the description is given taking the medium 101 that is a write-once dye medium as an example. However, the present invention is also applicable to phase change media and the like whose recorded information is rewritable because the operation sequence can be considered entirely the same except for a change in the item of recording conditions.

Further, in the above-described embodiment, the description is given with a case in mind where a predetermined control program executed in the microcomputer of the host controller 21 and implementing the program of the present invention is stored in the storage medium of the host controller 21, such as a ROM, and characteristic processing performed by the optical information recording apparatus and the optical information recording method of the present invention is implemented by processing performed by the microcomputer based on the control program.

However, the present invention is not limited to this. That is, a control program implementing the program of the present invention may be provided in a host computer, such as a personal computer, controlling the optical information recording and reproduction apparatus 1, and the optical information recording method of the present invention may be implemented by the host computer controlling the optical information recording and reproduction apparatus 1 based on the control program.

An overview of such a system is given below with reference to FIG. 9.

Figure 9:
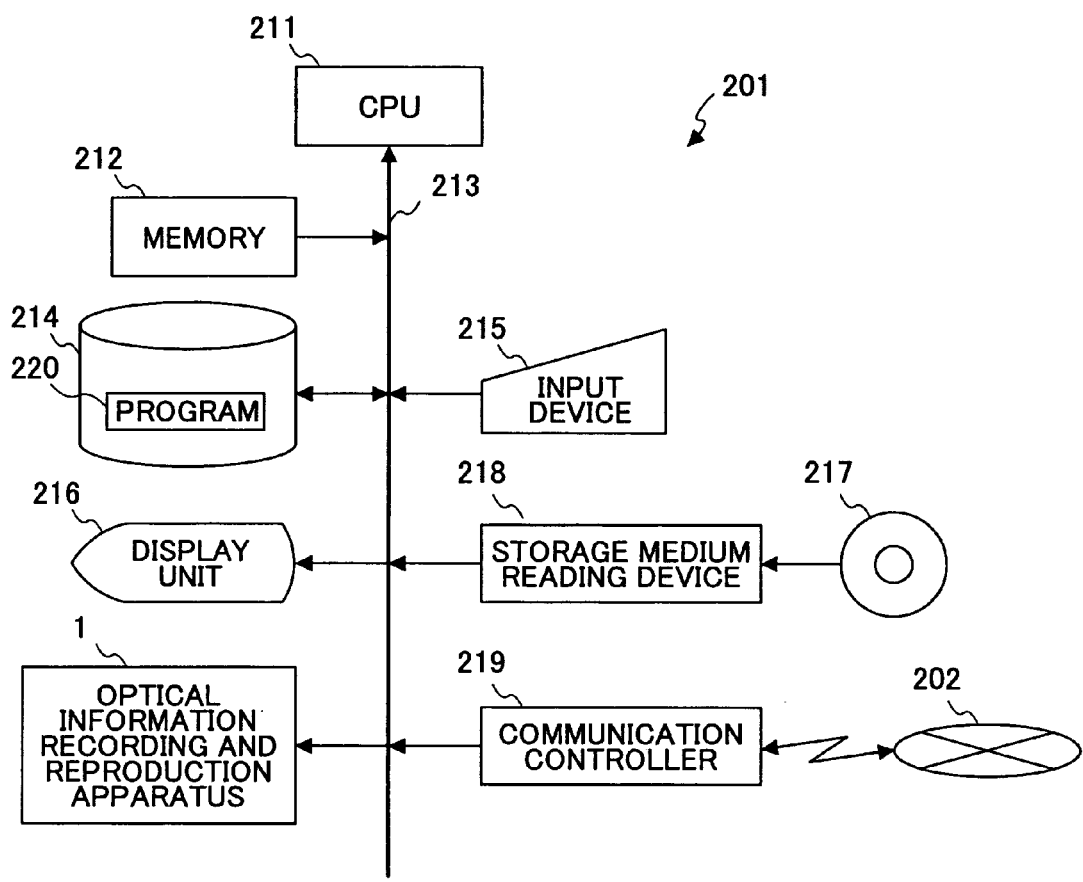
FIG. 9 is a block diagram of electrical connections of a host computer with the optical information recording and reproduction apparatus.

As shown in FIG. 9, in a host computer 201, a CPU 211 performing a variety of calculations and centralized control of each part of the host computer 201 and a memory 212 formed of various ROMs and RAMs are connected by a bus 213.

To the bus 213, a magnetic storage device 214 such as a hard disk, an input device 215 formed of a mouse, a keyboard and the like, a display unit 216, a storage medium reading device 218 reading a storage medium 217 such as an optical disk, and the optical information recording and reproduction apparatus 1 are connected via predetermined interfaces, and a predetermined communication interface (communication controller) 219 performing communications with a network 202 is connected. As the storage medium 217, a variety of media such as optical disks such as CDs and DVDs, magneto-optical disks, and flexible disks may be employed. Further, as the storage medium reading device 218, specifically, an optical disk unit, a magneto-optical disk unit, a flexible disk unit, or the like is employed depending on the type of the storage medium 217. In the case of employing an optical disk unit as the storage medium reading device 218, it may be implemented by the same apparatus as the optical information recording and reproduction apparatus 1.

The host computer 201 reads programs 220 implementing the program of the present invention from the storage medium 217 implementing the storage medium of the present invention, and installs them in the magnetic storage device 214. These programs 220 may be downloaded via the network 202 or the Internet to be installed. By this installation, the host computer 201 controls the optical information recording and reproduction apparatus 1 based on the programs 220 and realizes the above-described control contents characteristic of the present invention. That is the programs 220 are the driver software and the like of the optical information recording and reproduction apparatus 1. The programs 220 may be those that operate on a predetermined OS.

The present invention is not limited to the specifically disclosed embodiment, and variations and modifications may be made without departing from the scope of the present invention.

What is claimed is:

1. An optical information recording apparatus for recording information on an optical information recording medium having a structure of multiple recording layers on each of which recording is performable, the optical information recording apparatus performing a predetermined OPC operation in advance at a time of performing the recording, the optical information recording apparatus comprising:

a reading part configured to read information on a type of the optical information recording medium, the information being recorded on the optical information recording medium;

a storage unit configured to store information on a recording condition at a time of performing the predetermined OPC operation for each of the recording layers with respect to one or each of a plurality of types of optical information recording media;

a recording condition obtaining part configured to read out the recording condition corresponding to the read type when the recording condition is stored in the storage unit, and read the recording condition recorded in a corresponding one of the recording layers of the optical information recording medium, the recording layers recording the respective recording conditions thereof, when the recording condition is not stored in the storage unit; and an OPC performance part configured to perform the predetermined OPC operation using the obtained recording condition.

2. The optical information recording apparatus as claimed in claim 1, further comprising:

a determination part configured to determine whether an area in one of the recording layers other than the corresponding one of the recording layers on which the predetermined OPC operation is to be performed is in an erased state or a recorded state, wherein the area is directly above or directly below the area in which the predetermined OPC operation is to be performed, wherein the storage unit, with respect to each of the recording layers, is further configured to store the information on the recording condition for each of a case where the other one of the recording layers is in the erased state and a case where the other one of the recording layers is in the recorded state; and wherein the recording condition obtaining part is further configured so that, at a time of reading out the recording condition stored in the storage unit, the recording condition obtaining part reads out the recording condition of the case of the erased state or the case of the recorded state in accordance with the determination, and at a time of reading the recording condition recorded in the corresponding one of the recording layers, reads one of the recording conditions recorded in the corresponding one of the recording layers in accordance with the determination, the recording conditions being of the case where the other one of the recording layers is in the erased state and the case where the other one of the recording layers is in the recorded state, respectively.

3. The optical information recording apparatus as claimed in claim 1, wherein the recording condition comprises at least a recording power set value at the time of performing the predetermined OPC operation.

4. The optical information recording apparatus as claimed in claim 1, wherein the recording condition comprises at least a recording pulse shape at the time of performing the predetermined OPC operation.

5. The optical information recording apparatus as claimed in claim 1, wherein the recording condition comprises at least a recording light wavelength at the time of performing the predetermined OPC operation.

6. The optical information recording apparatus as claimed in claim 1, wherein the recording condition comprises at least a maximum recording rate at the time of performing the predetermined OPC operation.

7. An optical information recording medium having a structure of multiple recording layers on each of which recording is performable, wherein:

in each of the recording layers, a recording condition at a time of performing a predetermined OPC operation on the recording layer is recorded for each of a case where one of the recording layers other than the recording layer is in an erased state and a case where the other one of the recording layers is in a recorded state.

8. An optical information recording method for recording information on an optical information recording medium having a structure of multiple recording layers on each of which recording is performable, the optical information recording method performing a predetermined OPC operation in advance at a time of performing the recording, the optical information recording method comprising:

a reading step of reading information on a type of the optical information recording medium, the information being recorded on the optical information recording medium;

a recording condition obtaining step of, referring to a storage unit configured to store information on a recording condition at a time of performing the predetermined OPC operation for each of the recording layers with respect to one or each of a plurality of types of optical information recording media, reading out the recording condition corresponding to the type read in the reading step when the recording condition is stored in the storage unit, and reading the recording condition recorded in a corresponding one of the recording layers of the optical information recording medium, the recording layers recording the respective recording conditions thereof, when the recording condition is not stored in the storage unit; and an OPC performance step of performing the predetermined OPC operation using the recording condition obtained by the recording condition obtaining step.

9. The optical information recording method as claimed in claim 8, further comprising:

a determination step of determining whether an area in one of the recording layers other than the corresponding one of the recording layers on which the predetermined OPC operation is to be performed is in an erased state or a recorded state, wherein the area is directly above or directly below the area in which the predetermined OPC operation is to be performed, wherein the storage unit, with respect to each of the recording layers, stores the information on the recording condition for each of a case where the other one of the recording layers is in the erased state and a case where the other one of the recording layers is in the recorded state; and wherein the recording condition obtaining step, at a time of reading out the recording condition stored in the storage unit, reads out the recording condition of the case of the erased state or the case of the recorded state in accordance with the determination, and at a time of reading the recording condition recorded in the corresponding one of the recording layers, reads one of the recording conditions recorded in the corresponding one of the recording layers in accordance with the determination, the recording conditions being of the case where the other one of the recording layers is in the erased state and the case where the other one of the recording layers is in the recorded state, respectively.

10. The optical information recording method as claimed in claim 8, wherein the recording condition comprises at least a recording power set value at the time of performing the predetermined OPC operation.

11. The optical information recording method as claimed in claim 8, wherein the recording condition comprises at least a recording pulse shape at the time of performing the predetermined OPC operation.

12. The optical information recording method as claimed in claim 8, wherein the recording condition comprises at least a recording light wavelength at the time of performing the predetermined OPC operation.

13. The optical information recording method as claimed in claim 8, wherein the recording condition comprises at least a maximum recording rate at the time of performing the predetermined OPC operation.

14. A computer-readable information storage medium storing a program for causing a computer to execute an operation of controlling an optical information recording apparatus for recording information on an optical information recording medium having a structure of multiple recording layers on each of which recording is performable, the optical information recording apparatus performing a predetermined OPC operation in advance at a time of performing the recording, the program comprising instructions to cause the computer to operate as:
- a reading part configured to read information on a type of the optical information recording medium, the information being recorded on the optical information recording medium;
- a recording condition obtaining part configured to read out a recording condition corresponding to the read type when the recording condition is stored in a storage unit storing information on a recording condition at a time of performing the predetermined OPC operation for each of the recording layers with respect to one or each of a plurality of types of optical information recording media, and read the recording condition recorded in a corresponding one of the recording layers of the optical information recording medium, the recording layers recording the respective recording conditions thereof, when the recording condition is not stored in the storage unit; and
- an OPC performance part configured to perform the predetermined OPC operation using the recording condition obtained by the recording condition obtaining part.

15. The computer-readable information storage medium as claimed in claim 14, wherein the program further causes the computer to operate as a determination part configured to determine whether an area in one of the recording layers other than the corresponding one of the recording layers on which the predetermined OPC operation is to be performed is in an erased state or a recorded state, wherein the area is directly above or below the area in which the predetermined OPC operation is to be performed, wherein when the program causes the computer to operate as the recording condition obtaining part, the program further causes the computer to read out, at a time of reading out the recording condition stored in the storage unit storing, with respect to each of the recording layers, the information on the recording condition for each of a case where the other one of the recording layers is in the erased state and a case where the other one of the recording layers is in the recorded state, the recording condition of the case of the erased state or the case of the recorded state in accordance with the determination, and at a time of reading the recording condition recorded in the corresponding one of the recording layers, read one of the recording conditions recorded in the corresponding one of the recording layers in accordance with the determination, the recording conditions being of the case where the other one of the recording layers is in the erased state and the case where the other one of the recording layers is in the recorded state, respectively.

16. The computer-readable information storage medium as claimed in claim 14, wherein the recording condition comprises at least a recording power set value at the time of performing the predetermined OPC operation.

17. The computer-readable information storage medium as claimed in claim 14, wherein the recording condition comprises at least a recording pulse shape at the time of performing the predetermined OPC operation.

18. The computer-readable information storage medium as claimed in claim 14, wherein the recording condition comprises at least a recording light wavelength at the time of performing the predetermined OPC operation.

19. The computer-readable information storage medium as claimed in claim 14, wherein the recording condition comprises at least a maximum recording rate at the time of performing the predetermined OPC operation.

* * * * *